US012671493B2

(12) United States Patent (10) Patent No.: US 12,671,493 B2
Gilbert-Eyres et al. (45) Date of Patent: Jun. 30, 2026

(54) ENHANCED SATELLITE COMMUNICATIONS

(71) Applicant: GM GLOBAL TECHNOLOGY OPERATIONS LLC, Detroit, MI (US)

(72) Inventors: Matthew E. Gilbert-Eyres, Rochester Hills, MI (US); Eric T. Hosey, Royal Oak, MI (US); Russell A. Patenaude, Macomb Township, MI (US); Scott T. Droste, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 332 days.

(21) Appl. No.: 18/183,244

(22) Filed: Mar. 14, 2023

(65) Prior Publication Data

US 2024/0313850 A1 Sep. 19, 2024

(51) Int. Cl.
*H04B 7/185* (2006.01)
*B64C 1/36* (2006.01)
*B64U 10/00* (2023.01)
*B64U 101/20* (2023.01)
*G05D 1/00* (2024.01)

(52) U.S. Cl.
CPC .......... *H04B 7/18506* (2013.01); *B64C 1/36* (2013.01); *G05D 1/0094* (2013.01); *G05D 1/106* (2019.05); *H04B 7/18513* (2013.01); *B64U 10/00* (2023.01); *B64U 2101/20* (2023.01); *B64U 2201/20* (2023.01)

(58) Field of Classification Search
CPC ............ H04B 7/18506; H04B 7/18513; H04B 7/18504; H04B 7/18508; B64C 1/36; B64U 10/00; B64U 2101/20; B64U 2201/20; G05D 1/0094; G05D 1/106
See application file for complete search history.

(56) References Cited

U.S. PATENT DOCUMENTS

| | | | | |
|---|---|---|---|---|
| 9,853,712 | B2 * | 12/2017 | Jalali .................. | H04B 7/18504 |
| 2020/0159209 | A1 * | 5/2020 | Montoya-Mejia ... | G05D 1/0016 |
| 2021/0256255 | A1 * | 8/2021 | Al Qizwini ............. | G08G 5/32 |
| 2022/0283313 | A1 * | 9/2022 | Lekutai .................... | G08G 5/26 |
| 2024/0025544 | A1 * | 1/2024 | Candelore ............... | B64F 1/364 |
| 2025/0192873 | A1 * | 6/2025 | Galic ................. | H04B 7/18513 |

* cited by examiner

Primary Examiner — Aniss Chad
Assistant Examiner — Christine Nguyen Huynh
(74) Attorney, Agent, or Firm — Quinn IP Law

(57) ABSTRACT

A system for enhanced satellite communication coverage via an unmanned aerial vehicle (UAV). The system may include a satellite configured for orbiting Earth, a vehicle configured for ground transportation on Earth, and an unmanned aerial vehicle (UAV) operable for relaying communication signals between the vehicle and the satellite. The system may be configured for transmitting control instructions to the UAV for controlling aerial positioning of the UAV relative to the vehicle and the satellite. The control instructions may specifying a roll, a pitch, and a yaw for orientating the UAV to point towards the satellite.

20 Claims, 3 Drawing Sheets

ENHANCED SATELLITE COMMUNICATIONS

INTRODUCTION

The present disclosure relates to communications of the type occurring between satellites orbiting Earth and devices on Earth, such as but not necessarily limited to enhancing satellite communications with an intermediary aerially operating between the devices and satellites.

Despite the ever-increasing wireless connectivity provided via terrestrial cellular, Wi-Fi, and other wireless networks, a number of locations on Earth may nonetheless be effectively outside of the wireless coverage areas of terrestrial networks. Extraterrestrial networks having satellites orbiting Earth may be used to provide wireless connectivity when terrestrial networks may be unavailable. An ability of a device on Earth to communicate with a satellite may be dependent on a coverage area of the satellite and a capability of the device to maintain connectivity therewith. In the case of a mobile device, such as but not necessarily limited to a vehicle, the movement thereof may occur at a relatively high speed such that the presence of the device within the coverage area may be shorter than if the device were stationary and/or the movement may cause the device to periodically experience obstructions, blind spots, shadows, etc. that may interfere with satellite communications, such as from foliage or natural impediments.

SUMMARY

One non-limiting aspect of the present disclosure contemplates enhancing satellite communications with an intermediary configured for aerially operating between devices on Earth and orbiting satellites, such as but not necessarily limited to an unmanned aerial vehicle (UAV), drone, or other autonomous or non-autonomous vehicle. The intermediary may be configured to facilitate relaying communications between devices on Earth and the satellites such that a coverage area of the satellites may be increased and/or connectivity disruptions caused by blind spots, shadows, foliage, natural impediments, or other obstructions may be ameliorated.

One non-limiting aspect of the present disclosure relates to a system for connecting a vehicle with a satellite. The system may include a satellite controller configured for operating onboard the vehicle to select the satellite from a plurality of orbiting satellites and an intermediary controller configured for operating onboard the vehicle to instruct a UAV to fly relative to the vehicle and the satellite. The system may further include a communications controller configured for operating onboard the vehicle to wirelessly establish a communications connection between the vehicle, the UAV, and the satellite. The connection may be operable for wirelessly exchanging data between the vehicle, the UAV, and the satellite.

The intermediary controller may be configured for transmitting control instructions to the UAV, the controller instructions operable for controlling aerial positioning of the UAV relative to the vehicle and the satellite.

The control instructions may include orientation parameters for orientating a satellite-facing antenna included on the UAV to point in a direction towards an earth-facing antenna on the satellite.

The orientation parameters may specify a roll, a pitch, and a yaw to be used by the UAV in orientating the satellite-facing antenna towards the satellite.

The UAV may be unable to determine the roll, the pitch, and the yaw without the orientation parameters.

The control instructions may include movement parameters for directing the UAV to launch from and fly relative to the vehicle.

The intermediary controller may periodically update the control instructions to account for movement of the vehicle.

The vehicle may include a UAV-facing antenna and the UAV may include a vehicle-facing antenna, with a terrestrial portion of the connection occurring between the vehicle and UAV-facing antennas and an extraterrestrial portion of the connection occurs between the satellite-facing antenna and the earth-facing antenna.

The terrestrial portion may occur within a first frequency range, and the extraterrestrial portion occurs within a second frequency range, optionally with at least a portion of the second frequency range being outside of the first frequency range.

The intermediary controller may be configured for controlling a second UAV to fly relative to the UAV and the satellite. The communications controller may be configured for wirelessly establishing the connection between the vehicle, the UAV, the second UAV, and the satellite.

One non-limiting aspect of the present disclosure relates to a system for enhanced satellite communication coverage via an unmanned aerial vehicle (UAV). The system may include an intermediary controller configured for operating onboard a vehicle to instruct the UAV to fly relative to the vehicle and a satellite, and a communications controller configured for operating onboard the vehicle to wirelessly establish a communications connection between the vehicle, the UAV, and the satellite, The connection may include a terrestrial portion between the vehicle and the UAV and an extraterrestrial portion between the UAV and the satellite.

The vehicle may include a UAV-facing antenna. The UAV may include a vehicle-facing antenna and a satellite-facing antenna. The satellite may include an earth-facing antenna. The terrestrial portion may occur between the vehicle-facing antenna and the UAV-facing antenna, and the extraterrestrial portion may occur between the satellite-facing antenna and the earth-facing antenna.

The intermediary controller may be configured for transmitting control instructions to the UAV. The controller instructions may be operable for controlling aerial positioning of the UAV relative to the vehicle and the satellite.

The control instructions may include orientation parameters for orientating the satellite-facing antenna towards the earth-facing antenna.

The orientation parameters may specify a roll, a pitch, and a yaw for orientating the satellite-facing antenna towards the earth-facing antenna.

One non-limiting aspect of the present disclosure relates to a system for enhanced satellite communication coverage. The system may include a satellite configured for orbiting Earth, a vehicle configured for ground transportation on Earth, and an unmanned aerial vehicle (UAV) operable for relaying communication signals between the vehicle and the satellite. The vehicle may be configured for transmitting control instructions to the UAV for controlling aerial positioning of the UAV relative to the vehicle and the satellite. The control instructions may specify a roll, a pitch, and a yaw for orientating the UAV to point towards the satellite.

The vehicle may be configured for determining the roll, the pitch, and the yaw based on determining a directionality between the UAV and the satellite. The UAV may be incapable of independently determining the directionality.

The vehicle may be configured for transmitting movement instructions for directing the UAV to fly within a line-of-sight of the vehicle while the vehicle is moving.

The vehicle may be configured for transmitting updates for the roll, the pitch, and the yaw according to movement of the vehicle.

These features and advantages, along with other features and advantages of the present teachings, are readily apparent from the following detailed description of the modes for carrying out the present teachings when taken in connection with the accompanying drawings. It should be understood that even though the following figures and embodiments may be separately described, single features thereof may be combined to additional embodiments.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
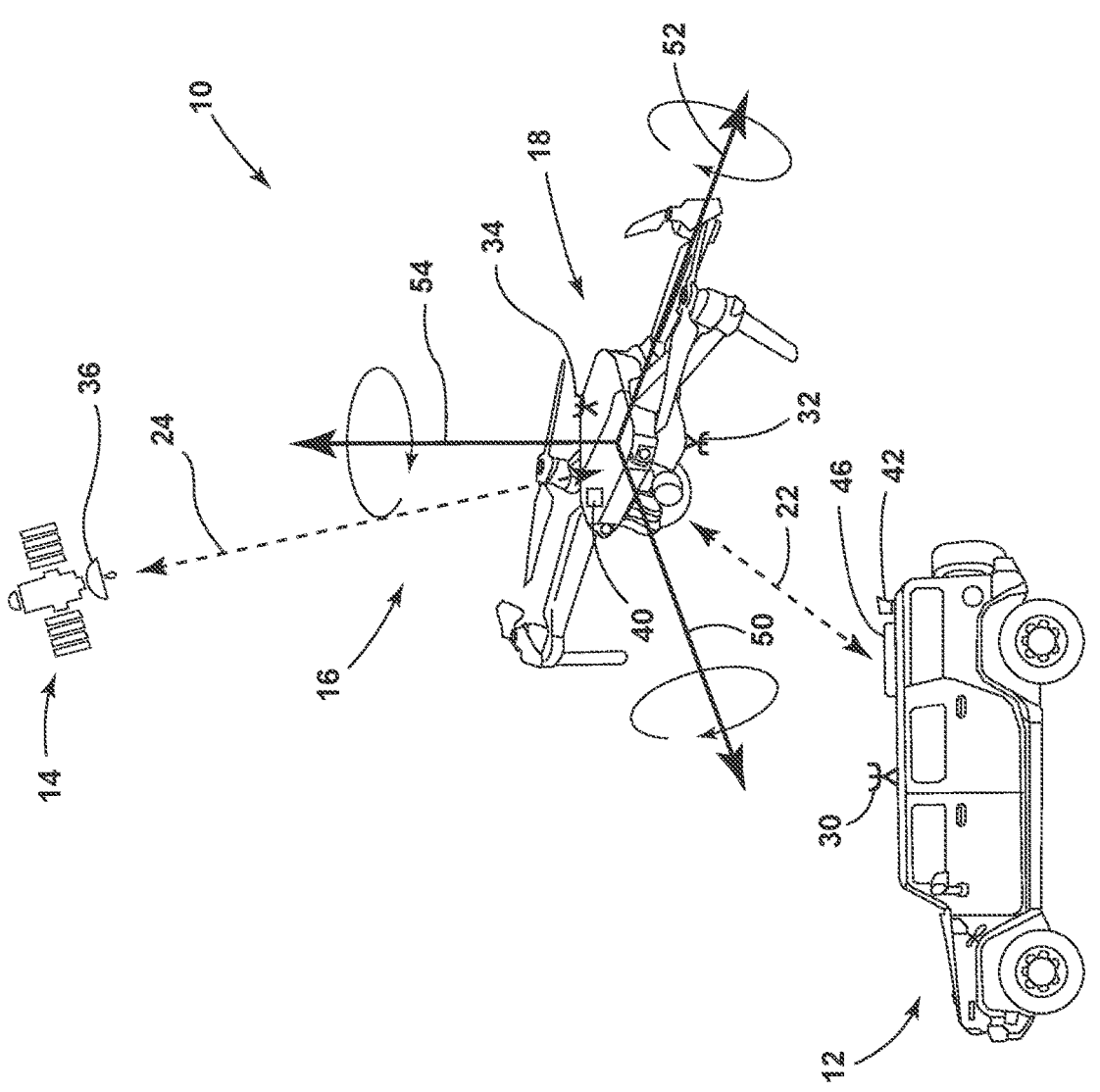
FIG. 1 illustrates a system for enhanced satellite communications in accordance with one non-limiting aspect of the present disclosure.

FIG. 1 illustrates a system 10 for enhanced satellite communications in accordance with one non-limiting aspect of the present disclosure. The satellite communications may correspond with wireless signals exchanged between a device 12 on Earth and a satellite 14 orbiting Earth. The satellite communications are shown for exemplary purposes to correspond with those wirelessly carried over a communications connection 16 established via an intermediary 18. The communications connection may include a terrestrial portion 22 between the device 12 and the intermediary 18 and an extraterrestrial portion 24 between the intermediary 18 and the satellite. The device 12 is shown for exemplary purposes as a ground vehicle 12 in order to demonstrate a beneficial aspect of the present disclosure in enhancing satellite communications for a device 12 capable of traveling at a relatively high rate of speed. The present disclosure, however, is not necessarily limited to ground vehicles 12 as the enhanced satellite communications described herein may be advantageous with other types of devices 12, including stationary and/or non-movable devices 12.

The intermediary 18 is shown for exemplary purposes to correspond with an unmanned aerial vehicle (UAV) 18 to demonstrate a beneficial aspect of the present disclosure of enhancing satellite communications with aerial equipment capable of aerially positioning itself between the device 12 and the satellite 14. The present disclosure, however, is not necessarily limited to UAVs 18 as other types of intermediaries may be similarly used, such as but not necessarily limited to drones, balloons, blimps, kites, or other autonomous or non-autonomous vehicles capable of operating in the manner described herein. While not shown, the satellite 14 may be configured to facilitate routing or otherwise communicating data exchanged via the communications connection 16 with additional satellites 14 and/or other devices 12. As one skilled in art will appreciate, the satellite 14 may be part of a satellite network whereby the satellite 14 may package or otherwise configure data, information, etc. for exchange through the communications connection 16 and/or for exchange with other satellites 14 and/or other destinations on Earth.

A plurality of antennas 30, 32, 34, 36 may be included onboard the vehicle 12, the UAV 18, and the satellite 14 to facilitate wireless signaling needed to support the communications connection 16. One non-limiting aspect of the present disclosure contemplates the UAV 18 including a vehicle-facing antenna 32 configured for exchanging wireless signals with a UAV-facing antenna 30 of the vehicle 12 and a satellite-facing antenna 34 configured for exchanging wireless signals with an earth-facing antenna 36 of the satellite 14. The antennas 30, 32, 34, 36 may be configured as antenna arrays, directional antennas, etc. of various types and sizes having capabilities sufficient to facilitate the contemplated wireless signaling. The wireless signaling occurring over the terrestrial connection 22, i.e., that exchange between the UAV-facing antenna 30 and the vehicle-facing antenna 32, may be differentiated from wireless signaling occurring over extraterrestrial connection 24, i.e., that exchange between the satellite-facing antenna 34 and the earth-facing antenna 36. The terrestrial connection 22, for example, may be associated with lower power, differing frequency ranges, less directionality, etc. than the extraterrestrial connection 24.

While the present disclosure fully contemplates other antenna configurations, such as the UAV 18 including a singular antenna, the illustrated antennas 30, 32, 34, 36 may be beneficial in providing a lower cost solution whereby the UAV 18 may be utilized without having to employ more costly communication equipment. The use of one antenna 32 to face towards the vehicle 12 and another antenna 34 to face towards the satellite 14, for example, may enable the UAV 18 to use less expensive equipment that would be needed with an omnidirectional antenna, a single antenna, or another configuration whereby orientation of the antennas relative to each other may be less relevant. The UAV antennas 32, 34 may optionally be affixed to the UAV 18 in the illustrated manner such that the vehicle-facing antenna 32 may be fixed proximate an underside of the UAV 18 and the satellite-based antenna 34 may be fixed proximate a topside of the UAV 18. While the UAV 18 antennas may be mounted via actuators or other movable features included on the UAV 18, such as those having capabilities to articulate the antennas 32, 34 independently of the UAV 18, the use of such additional equipment may be more expensive than having the contemplated arrangement with the antennas 32, 34 mounted at fixed locations.

One non-limiting aspect of the present disclosure contemplates maximizing a coverage area of the satellite 14 by controlling an orientation of the UAV 18 to maintain connectivity with both of the vehicle 12 and the satellite 14. The UAV 18, for example, may remain within the coverage area of the satellite 14 to support the extraterrestrial connection 24 with the satellite 14 while simultaneously maintaining the terrestrial connection 22 while the vehicle 12 moves beyond the coverage range of the satellite 14. The orientation of the UAV 18 may be similarly used to maintain connectivity with the vehicle 12 when in satellite's 14 blind spot or shadow, e.g., surrounded or otherwise obstructed by foliage, mountains, objects, natural impediments, etc. that would otherwise interfere with line-of-site signaling needed for direct communication between the vehicle 12 and the satellite 14. The capabilities of the UAV 18 to facilitate indirect communications between the satellite 14 and the vehicle 12 via the terrestrial and extraterrestrial connections 22, 24 may be helpful in maintaining connectivity when the vehicle 12 is traveling near or around obstructions.

The UAV 18 may include a UAV controller 40 onboard to facilitate the operations contemplated herein. The UAV controller 40 may optionally lack capabilities sufficient to identify the satellite 14 or otherwise orientate the satellite-facing antenna 34 relative thereto. The UAV controller 40, for example, may be a relatively low cost controller capable of limited processing such that the controller 40 may be limited to flying the UAV 18 according to control instructions provided from the vehicle 12. The vehicle 12 may include a vehicle controller 42 configured for transmitting the control instructions to the UAV 18. The vehicle controller 42 may be a more expensive and sophisticated controller than the UAV 18 controller, with greater processing capabilities. The vehicle controller 42 may include separate or integrated controllers to facilitate various operations contemplated herein, such as but not necessarily limited to a satellite controller, an intermediary controller, and a communications controller. The vehicle controller 42 may include non-transitory instructions stored on a computer-readable storage medium, which when executed with an associated processor, may be sufficient to facilitate the operations and other processes described herein.

The vehicle controller 42 may be configured for generating and transmitting the control instructions used for instructing the UAV 18 to fly relative to the vehicle 12 and the satellite 14, such as to hover, chase, or otherwise move from various locations therebetween. The control instructions may include movement parameters sufficient for instructing the UAV 18 to fly or otherwise aerially move relative to the vehicle 12, which may include instructing the UAV 18 to keep a particular distance relative to the vehicle 12 (e.g., x, y, z coordinates) or to take other positioning. The UAV 18 may optionally be unable to determine the desired roll, pitch, and yaw itself. The control instructions transmitted from the vehicle controller 42 may optionally cooperate with guidance or collision avoidance capabilities of the UAV controller 40 to avoid the UAV 18 colliding with other objects while flying. One non-limiting aspect of the present disclosure contemplates the vehicle 12 including a docking station 46 for receiving and transporting the UAV 18 when not in use. The control instructions may include movement parameters sufficient for facilitating launch and recovery of the UAV 18 relative to the docking station 46, optionally while the vehicle 12 is in motion. The vehicle controller 42 may be configured for repeatedly or continuously transmitting the movement parameters to the UAV 18 so as to maintain a tether or other continuous contact with the UAV 18 sufficient for guiding his movements in the contemplated manner.

The control instructions transmitted from the vehicle controller 42 may additionally include orientation parameters for controlling an orientation of the UAV 18 relative to the satellite 14 in the vehicle 12. The orientation instructions, for example, may include parameters for specifying a roll, a pitch, and/or a yaw to be used by the UAV 18 for orientating itself relative to the vehicle 12 and the satellite 14. The roll, pitch, and yaw may be defined according to corresponding axes 50, 52, 54, with values therefor capable of being selectively and independently controlled relative to each axis 50, 52, 54. The orientation parameters may be used in this manner to precisely control a relative orientation of the vehicle-facing antenna 32 toward the vehicle 12 and/or the satellite-facing antenna 34 towards the satellite 14. In the event the vehicle-facing and/or satellite-facing antennas 32, 34 are independently controllable, the orientation parameters may provide separate orientation for each according to the desired roll, pitch, and yaw. As one skilled in the art may appreciate, the extraterrestrial connection 24 may require a relatively high degree of directionality and precision, which may require relatively sophisticated processing capabilities, both in terms of identifying suitable satellites 14 and orientating thereto.

The orientation parameters and/or other information or data needed to orientate the UAV 18 relative to the satellite 14 and the vehicle 12 may be generated with the vehicle controller 42. The vehicle controller 42 may be configured for monitoring or otherwise selecting to the satellite 14 from a plurality of satellites 14 orbiting Earth, such as based on Ephemeris data provided from an operator or other entity associated therewith. The vehicle controller 42, for example, may cross-reference the Ephemeris data with a current position of the vehicle 12 and a current time of day to select the satellite 14. Once the desired satellite 14 is selected, the vehicle controller 42 may generate the control instructions used to launch the UAV 18, orientate the UAV 18 relative to the vehicle 12 and the satellite 14, and maintain relative positioning of the UAV 18 as the vehicle 12 travels. The vehicle controller 42 may effectively control the UAV 18 to act as an intermediary relay between the terrestrial portion 22 and the extraterrestrial portion 24 of the communication connection 16 without requiring the UAV 18 to identify the satellite 14, independently orientate itself between the satellite 14 in the vehicle 12, or otherwise perform complex processes other than controlling its roll, pitch, and yaw and relative position to the vehicle 12, optionally with the assistance of resident capabilities for collision avoidance.

Figure 2:
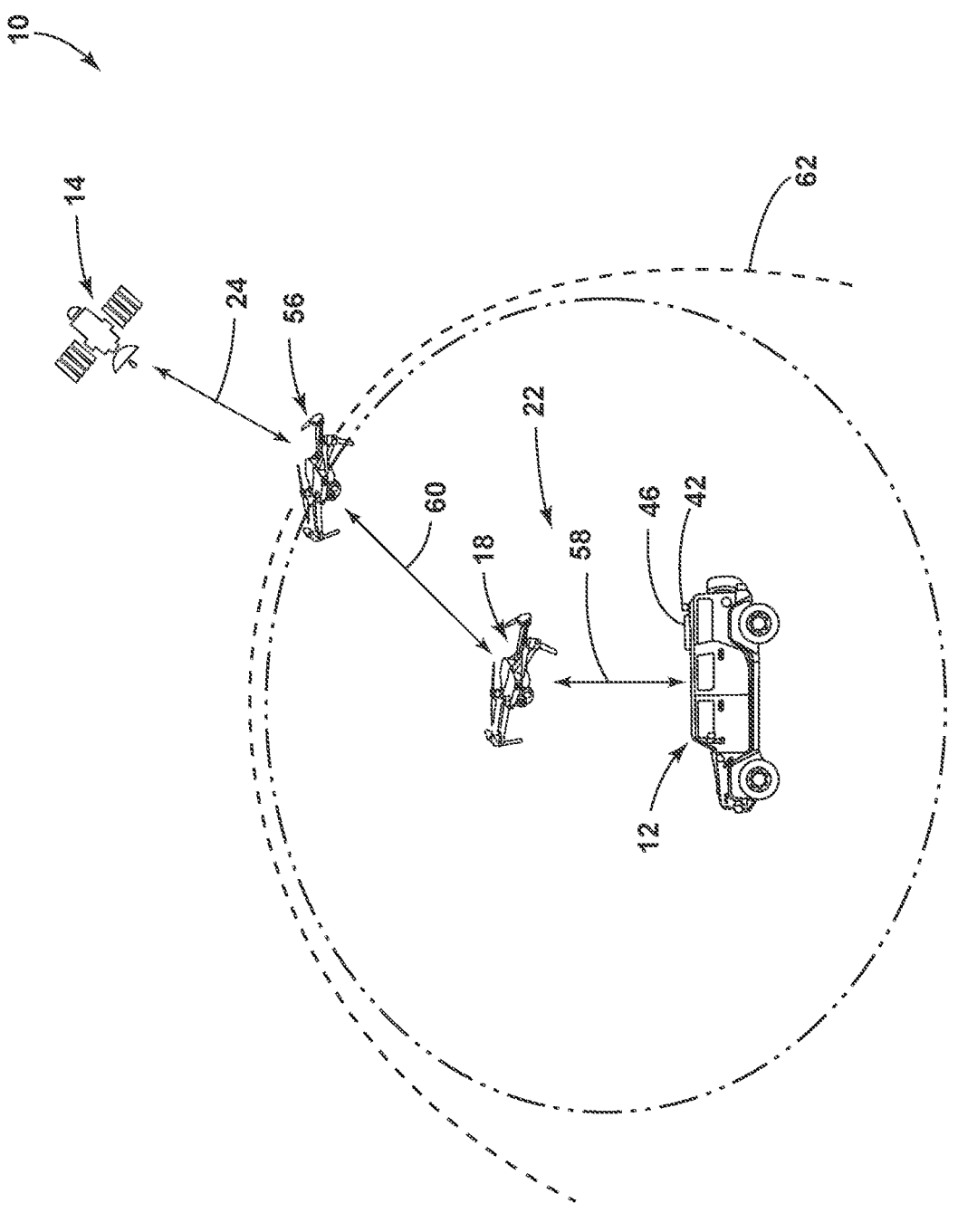
FIG. 2 illustrates a system for enhanced satellite communications employing multiple UAVs in accordance with one non-limiting aspect of the present disclosure.

FIG. 2 illustrates the system 10 for enhanced satellite 14 communications employing multiple UAVs 18, 56 in accordance with one non-limiting aspect of the present disclosure. The vehicle 12, UAV 18, and satellite 14 may operate in the manner described above, with an additional UAV 56 being operable therewith to separate the extraterrestrial connection 24 into a first extraterrestrial connection 58 and a second extraterrestrial connection 60. The additional UAV 18 may be similar or identical to the UAV 18 described in FIG. 1, or optionally another UAV 18 type of UAV 18 having capabilities for flying at higher altitudes. The additional UAV 18 may be launched from the vehicle 12 and similarly controlled with control instructions issued from the vehicle controller 42. The control instructions applicable to the additional UAV 56 may optionally be relayed thereto through the other UAV 18, which may be beneficial in extending a distance that the additional UAV 56 may be positioned relative to the vehicle 12 while still maintaining connectivity between the vehicle 12 and the satellite 14 via the closer UAV 18. The additional UAV 56 may optionally be a drone or other autonomous device 12 configured for low-Earth orbit, such as along a drone path 62, in which case, the control instructions may be used for orientating the closer UAV 18 relative to the second UAV 56 and the second UAV 56 relative to the satellite 14.

Figure 3:
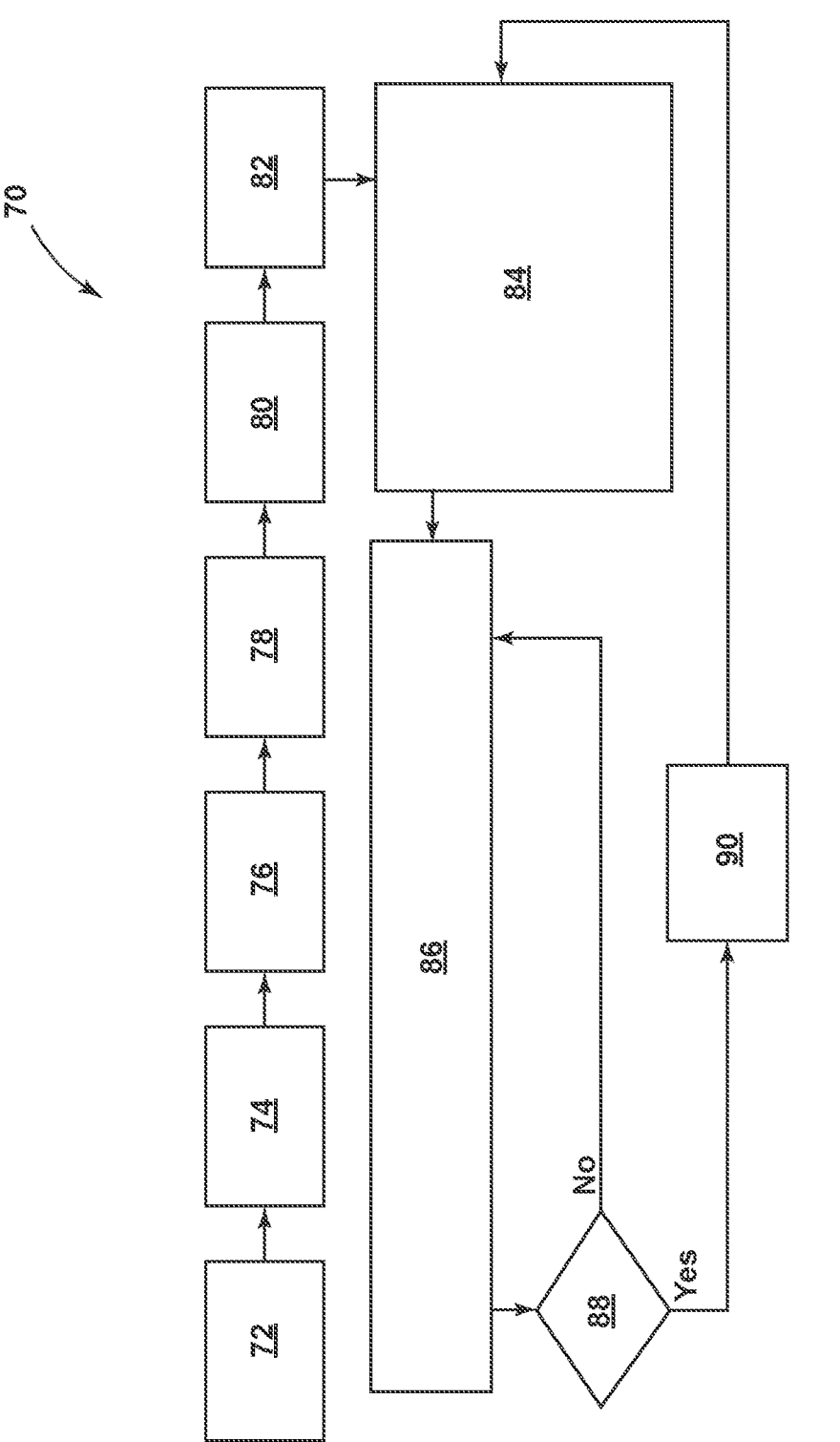
FIG. 3 illustrates a flowchart of a method for enhanced satellite communications in accordance with one non-limiting aspect of the present disclosure.

FIG. 3 illustrates a flowchart 70 of a method for enhanced satellite communications in accordance with one non-limiting aspect of the present disclosure. The method is predominantly described with respect to two UAVs 18, 56 for non-limited purposes as the present disclosure fully contemplates the use of a singular UAV 18 and/or more than two UAVs 18, 56. Block 72 relates to a launch process whereby the vehicle controller 42 may launch one and/or both of the UAV 18, 56, e.g., both UAVs 18, 56 may be launched from the vehicle 12 when being transported thereon and/or the lower UAV 18 may be carried on and launched from the vehicle 12 with the further UAV 56 being launched from another location or optionally a drone or other device already in aerial operation. The launch process may include the vehicle controller 42 determining a range for the UAVs 18, 56 relative to the vehicle 12 and the satellite 14. Block 74 relates to a standby process whereby the vehicle controller 42 may instruct the further UAV 56 to a standby position within range of the closer UAV 18. Block 76 relates to a communications process whereby the vehicle controller 42 may establish the connections 58, 60 with the UAVs 18, 56.

Block 78 relates to an analysis process whereby the vehicle controller 42 may utilize its enhanced processing capabilities to identify a plurality of satellites orbiting Earth. Block 80 relates to a selection process whereby the vehicle controller 42 may process operational capabilities, orbits, etc. for the satellites to select a desired satellite 14 for supporting the extraterrestrial connection 24 with the further UAV 56. Block 82 relates to a movement process whereby the vehicle controller 42 assesses whether the vehicle 12 is in motion or desire to be in motion. One aspect of the present disclosure contemplates the movement process including autonomously controlling the vehicle 12 to a desired position for maximizing communications with the UAVs 18, 56. The movement process may additionally include estimating a path or trajectory for the vehicle 12 to be used in facilitating relative positioning of the UAVs 18, 56 while the vehicle 12 is in motion. Block 84 relates to an orientation process whereby the vehicle controller 42 transmits the control instructions to the UAVs 18, 56. The orientation process may include generating the control instructions to facilitate controlling the UAVs 18, 56 to maintain a desired relative position to each other and/or the vehicle 12, while additionally including instructions for orientating the antennas thereon relative to each other in the vehicle 12 and/or satellite 14.

Block 86 relates to a tethering process whereby the vehicle controller 42 may continuously transmit the control instructions to the UAVs 18, 56 to facilitate continuously adjusting the relative position to the vehicle 12 and the satellite 14 in concert with making corresponding adjustments to the roll, pitch, and yaw used to orientate antennas thereon relative to each other. The tendering process may require the vehicle controller 42 to utilize its enhanced processing capabilities to facilitate aerially maneuvering the UAVs 18, 56 to facilitate operations contemplated herein. The reliance on the vehicle controller 42 to provide the control instructions and otherwise direct operations of the UAVs 18, 56 may be advantageous in limiting the complexity and sophistication needed for operating the UAVs 18, 56. Block 88 relates to a ranging process whereby the vehicle controller 42 may monitor whether either the UAVs 18, 56 and/or the satellite 14 are moving beyond range or approaching a limit at which communications therebetween in the vehicle 12 may be maintained. This may include performing a signaling strength, assessing directionality, etc. Block 90 relates to an update process whereby communications may be switch to or between additional UAVs and/or satellites.

As supported above, one non-limiting aspect of the present disclosure contemplates addressing situations when cellular or Wi-Fi connections may be unavailable such that it may be desirable to establish a satellite connection. The satellite connection, for example, may be established with drones configured to fly above a vehicle the device in need of the satellite connection while using the compute power of the vehicle to help determine the optimal satellite to follow, point, and/or track. The satellite with the clearest signal relays may be identified for a continuous connection to the other satellite and/or vehicle. Using a two drone method to enhance connectivity to the vehicle is contemplated. This may include using one drone to fly above the target vehicle and/or device while the other points and tracks. Using onboard vehicle compute power to identify which satellite offers the best signal (time above horizon), and thereafter, move drone 2 to track the satellite and position it's latitude, longitude, roll, pitch, yaw to capture the best signal. While one drone is moving, the other drone may remain in the same altitude but adjust x, y, pitch, yaw position to track the moving drone. While the moving drone is actively following a satellite, the vehicle may be constantly monitoring other possible satellites by adding them to a que for use in the event a current satellite is no longer viable. Drone to drone and drone to vehicle connectivity may utilize low range connectivity.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. "A", "an", "the", "at least one", and "one or more" are used interchangeably to indicate that at least one of the items is present. A plurality of such items may be present unless the context clearly indicates otherwise. All numerical values of parameters (e.g., of quantities or conditions), unless otherwise indicated expressly or clearly in view of the context, including the appended claims, are to be understood as being modified in all instances by the term "about" whether or not "about" actually appears before the numerical value. A component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A system for connecting a vehicle with a satellite, comprising:
a satellite controller configured for operating onboard the vehicle to select the satellite from a plurality of orbiting satellites based on Ephemeris data of the plurality of orbiting satellites, a current position of the vehicle, and a current time;
an intermediary controller configured for operating onboard the vehicle to instruct an unmanned aerial vehicle to:
fly relative to the vehicle to maintain a first bidirectional communication connection with the vehicle; and
fly relative to the satellite to maintain a second bidirectional communication connection with the satellite; and
a communications controller configured for operating onboard the vehicle to wirelessly establish:
the first bidirectional communication connection between the vehicle and the unmanned aerial vehicle for wirelessly exchanging data bidirectionally between the vehicle and the unmanned aerial vehicle; and
the second bidirectional communication connection between the unmanned aerial vehicle and the satellite, the second bidirectional communication connection operable for wirelessly exchanging the data bidirectionally between the unmanned aerial vehicle and the satellite.

2. The system according to claim 1, wherein:
the intermediary controller is configured for transmitting control instructions to the unmanned aerial vehicle, the control instructions operable for controlling aerial positioning of the unmanned aerial vehicle relative to both the vehicle and the satellite.

3. The system according to claim 2, wherein:
the control instructions include orientation parameters for orientating a satellite-facing antenna included on the unmanned aerial vehicle to point in a direction towards an earth-facing antenna on the satellite.

4. The system according to claim 3, wherein:
the orientation parameters specify a roll, a pitch, and a yaw to be used by the unmanned aerial vehicle in orientating the satellite-facing antenna towards the satellite.

5. The system according to claim 4, wherein:
the unmanned aerial vehicle is unable to determine the roll, the pitch, and the yaw to orient the satellite-facing antenna towards the satellite without the orientation parameters.

6. The system according to claim 4, wherein:
the control instructions include movement parameters for directing the unmanned aerial vehicle to launch from and fly relative to the vehicle.

7. The system according to claim 6, wherein: the intermediary controller periodically updates the control instructions to account for movement of the vehicle.

8. The system according to claim 7, wherein:
the vehicle includes an unmanned aerial vehicle-facing antenna;
the unmanned aerial vehicle includes a vehicle-facing antenna;
a terrestrial portion of the first bidirectional communication connection occurs between the vehicle-facing antenna and the unmanned aerial vehicle-facing antennas; and
an extraterrestrial portion of the second bidirectional communication connection occurs between the satellite-facing antenna and the earth-facing antenna.

9. The system according to claim 8, wherein:
the terrestrial portion occurs within a first frequency range; and
the extraterrestrial portion occurs within a second frequency range, at least a portion of the second frequency range being outside of the first frequency range.

10. The system according to claim 1, wherein:
the intermediary controller is configured for controlling a second unmanned aerial vehicle to fly relative to both the unmanned aerial vehicle and the satellite; and
the communications controller is configured for wirelessly establishing a plurality of connections between:
the vehicle and the unmanned aerial vehicle;
the unmanned aerial vehicle and the second unmanned aerial vehicle; and
the second unmanned aerial vehicle and the satellite.

11. A system for enhanced satellite communication coverage via an unmanned aerial vehicle, comprising:
an intermediary controller configured for operating onboard a vehicle to instruct the unmanned aerial vehicle to:
fly relative to the vehicle to maintain a first bidirectional communication connection with the vehicle; and
fly relative to a satellite to maintain a second bidirectional communication connection with the satellite, wherein a selection of the satellite is based on Ephemeris data of the plurality of orbiting satellites, a current position of the vehicle, and a current time; and
a communications controller configured for operating onboard the vehicle to wirelessly establish:
the first bidirectional communication connection between the vehicle and the unmanned aerial vehicle, the first bidirectional communication connection including a bidirectional terrestrial portion between the vehicle and the unmanned aerial vehicle; and
the second bidirectional communication connection between the unmanned aerial vehicle and the satellite, the second bidirectional communication connection including a bidirectional extraterrestrial portion between the unmanned aerial vehicle and the satellite.

12. The system according to claim 11, wherein:
the vehicle includes an unmanned aerial vehicle-facing antenna;

the unmanned aerial vehicle includes both a vehicle-facing antenna and a satellite-facing antenna;

the satellite includes an earth-facing antenna;

the bidirectional terrestrial portion occurs between the vehicle-facing antenna and the unmanned aerial vehicle-facing antenna; and the bidirectional extraterrestrial portion occurs between the satellite-facing antenna and the earth-facing antenna.

13. The system according to claim 12, wherein:

the intermediary controller is configured for transmitting control instructions to the unmanned aerial vehicle, the control instructions operable for controlling aerial positioning of the unmanned aerial vehicle relative to both the vehicle and the satellite.

14. The system according to claim 13, wherein:

the control instructions include orientation parameters for orientating the satellite-facing antenna towards the earth-facing antenna.

15. The system according to claim 14, wherein:

the orientation parameters specify a roll, a pitch, and a yaw for orientating the satellite-facing antenna towards the earth-facing antenna.

16. The system according to claim 15, wherein:

the unmanned aerial vehicle is unable to determine the roll, the pitch, and the yaw to orient the satellite-facing antenna towards the satellite without the orientation parameters.

17. The system according to claim 13, wherein:

the control instructions include movement parameters for directing the unmanned aerial vehicle to launch from and fly relative to the vehicle.

18. The system according to claim 13, wherein:

the intermediary controller periodically updates the control instructions to account for movement of the vehicle.

19. The system according to claim 11, wherein:

the bidirectional terrestrial portion occurs within a first frequency range; and the bidirectional extraterrestrial portion occurs within a second frequency range, at least a portion of the second frequency range being outside of the first frequency range.

20. The system according to claim 11, wherein:

the intermediary controller is configured for controlling a second unmanned aerial vehicle to fly relative to both the unmanned aerial vehicle and the satellite; and the communications controller is configured for wirelessly establishing a plurality of connections between:

the vehicle and the unmanned aerial vehicle;

the unmanned aerial vehicle and the second unmanned aerial vehicle; and the second unmanned aerial vehicle and the satellite.

* * * * *